(12) United States Patent
Price et al.

(10) Patent No.: US 8,454,873 B2
(45) Date of Patent: Jun. 4, 2013

(54) FLOOR MAT WITH INTEGRALLY MOLDED CARPETING, AND ASSOCIATED INJECTION MOLD

(75) Inventors: Robert A. Price, Glencoe, IL (US); Michael J. Milella, Jr., Richmond, IL (US); David A. Reband, Antioch, IL (US); Karl J. Mazur, Richmond, IL (US); Robert M. Miller, Chicago, IL (US)

(73) Assignee: Thermoflex Corporation, Waukegan, IL (US)

( * ) Notice: Subject to any disclaimer, the term of this patent is extended or adjusted under 35 U.S.C. 154(b) by 280 days.

(21) Appl. No.: 12/850,931

(22) Filed: Aug. 5, 2010

(65) Prior Publication Data
US 2012/0034409 A1 Feb. 9, 2012

(51) Int. Cl.
*B29C 45/14* (2006.01)
(52) U.S. Cl.
USPC ............................. 264/243; 264/261; 264/275
(58) Field of Classification Search
USPC ........................... 264/243, 252, 261, 275, 279
See application file for complete search history.

(56) References Cited

U.S. PATENT DOCUMENTS

| | | | |
|---|---|---|---|
| 4,491,556 A | 1/1985 | Fujii et al. | |
| 5,397,409 A * | 3/1995 | Kornylo | 156/79 |
| 5,919,324 A * | 7/1999 | Moffitt et al. | 156/79 |
| 6,479,006 B1 | 11/2002 | Kaufmann | |
| 7,524,389 B2 * | 4/2009 | Elbs et al. | 156/242 |
| 7,546,661 B2 * | 6/2009 | Connor, Jr. | 16/4 |

\* cited by examiner

*Primary Examiner* — Jill Heitbrink
(74) *Attorney, Agent, or Firm* — Greer, Burns & Crain, Ltd.

(57) ABSTRACT

A method for producing a carpet mat by injection molding, includes providing an injection mold including a cavity and a complementary core, each defining a portion of a mold recess for accommodating the finished carpet mat, providing the cavity with a surface having at least one vacuum opening bordered by a peripheral retaining barrier, applying vacuum to the core, inserting a sheet of carpet into the recess of the cavity and against the surface so that the carpet is in contact with the cavity, so that the carpet is held in the recess by the vacuum. Next, the cavity and core are closed together, thus sealing the recess, and a flowable supply of plastic is injected into the recess. Finally, the mold is opened after a specified period, allowing the plastic to at least partially solidify.

6 Claims, 10 Drawing Sheets

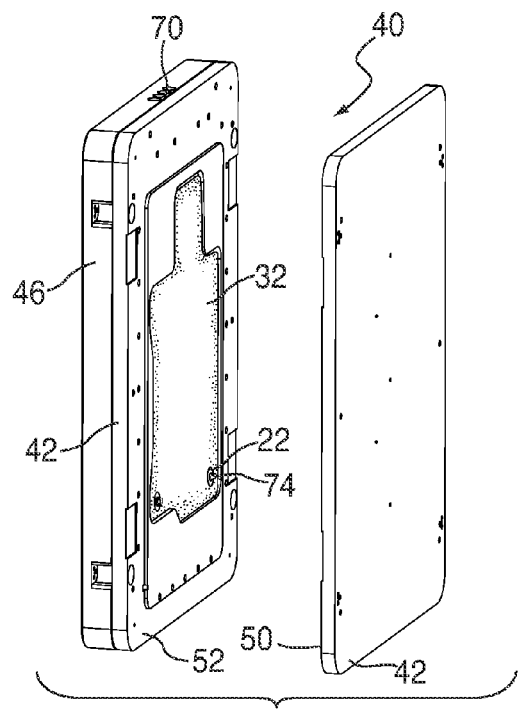
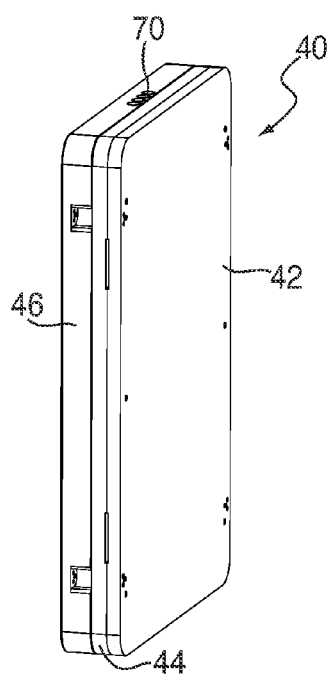
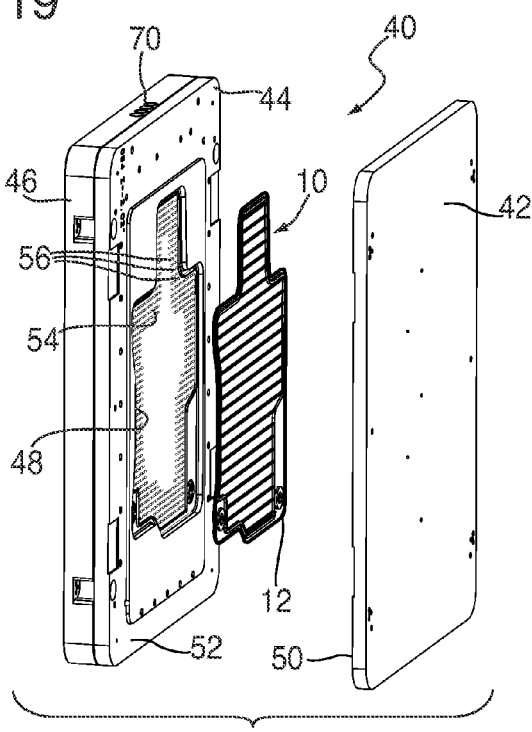

FLOOR MAT WITH INTEGRALLY MOLDED CARPETING, AND ASSOCIATED INJECTION MOLD

BACKGROUND OF THE INVENTION

The present invention relates to floor mats designed for being laid upon existing flooring, such as used in vehicles for protecting carpeting. More specifically, the present invention relates to an improved floor mat provided with carpeting, and a process for making same.

Conventional floor matting, as used in runners for commercial and residential flooring, involves laminating a web of carpeting upon a complementary web of rubber-like backing material. The two webs are adhered to each other using heat and/or chemical adhesives as is well known in the art. Such technology has been considered unsuitable for vehicle floor mats due, among other things, to the tendency for the carpeting to become detached from the backing material during normal use, especially at the peripheral edges.

Thus, overlay mats or lining carpets for vehicles are conventionally beaded. This beading is generally not detrimental to the desired flexibility of the carpet edge. However, such beadings are costly to produce and, moreover, have a considerable tendency to become soiled. The lifetime of such a carpet mat is usually limited, typically because a beading has been damaged.

In view of this problem, vehicle carpet mats are conventionally produced by first producing a hard-wearing carrier material from plastic by injection molding. A decorative material, such as carpet cut to size, has to be fastened into this carrier material in a further operation, typically using chemical adhesives or heat. So that cutting tolerances in the carpet can be absorbed or colored, but also to make a reinforced border available for the carpet edge, the carrier material is preferably produced with an undercut. This undercut, on the one hand, solves the problem of the cutting tolerances, but, on the other hand, creates a new problem.

Injection molds with corresponding slide systems are typically required to produce a clean undercut with an overhang which is suitable for covering tolerances of at least several millimeters. Only with the aid of such slide systems is it possible to remove the ready-molded carrier material from the mold damage free. Moreover, carpet edges bordered in this way prove to be insufficiently flexible. Furthermore, the operation of gluing the decorative material onto the carrier material represents an additional increase in price of the final product, and the adhesive power of the glue has been known to decrease over time and with extended use. Another drawback of such techniques is that apertured grommets used to releasably secure these mats to the vehicle floor must be added by hand post-molding.

U.S. Pat. No. 4,491,556 discloses a method and a device for producing a carpet mat, with an injection-molding unit including two molds. At least one of the molds has a cavity for forming the edges of a mat underlay. The method involves fitting a carpet into this receiving depression and injecting a thermoplastic resin into the space behind the carpet to provide a mat underlay which is simultaneously connected to the carpet. The '556 patent recognizes the problems inherent with injection molding carpet mats, including that the flowing resin migrates into the carpeting, and that the heat of the mold thins or otherwise degrades the carpeting during the molding process. While the '556 disclosure allegedly resolved this problem, this technique has not been adopted by the commercial vehicle mat manufacturing industry.

SUMMARY

The above-listed needs are met or exceeded by the present injection molded carpet mat, featuring a web of carpet which is integrally formed with a supportive flexible mat. In the preferred embodiment, upper surfaces of the carpet and the surrounding mat are generally flush with each other. Further, the molds used to make such a mat are vertically oriented to face each other and separate along a vertical plane. Such disposition of the mold facilitates mass production and reduces mold cycle time. To retain the carpet web in position prior to the injection of liquid plastic, one half of the mold is subject to vacuum. The vacuum is maintained until the injection of the plastic and its eventual cooling and solidifying. A peripheral rib in the mold holds the carpet under pressure and also acts as a guard to prevent the migration of plastic into the carpeting. Further, a mold support landing is provided in the vacuum side of the mold to support an apertured vacuum plate to which the carpet is held upon the activation of vacuum.

More specifically, a method for producing a carpet mat by injection molding is provided and includes providing an injection mold including a cavity and a complementary core, each defining a portion of a mold recess for accommodating the finished carpet mat, providing the cavity with a surface having at least one vacuum opening bordered by a peripheral retaining barrier, applying vacuum to the cavity, inserting a sheet of carpet into the mold recess of the cavity and against the surface so that the carpet is in contact with the cavity, so that the carpet is held in the mold recess by the vacuum. Next, the cavity and core are closed together, thus sealing the recess, and a flowable supply of plastic is injected into the mold recess. Finally, the mold is opened after a specified period, allowing the plastic to at least partially solidify.

In another embodiment, an injection molded carpet mat is provided, including a flexible base having an upper surface defining a carpet recess, and an opposite lower surface, a carpet sheet secured in the carpet recess by being integrally formed with the base, and having a top surface and a bottom surface. The top surface of the carpet sheet is flush with the upper surface of the base.

In yet another embodiment, a mold for forming a carpet mat in which the mat is formed around the carpet, integrally forming the carpet with the mold, includes a core partially defining a recess for forming the mat; and a cavity partially defining the recess, and including a retaining barrier disposed about a periphery of a carpet portion of the recess, and a carpet support plate bordered by the barrier and having at least one vacuum opening.

BRIEF DESCRIPTION OF THE DRAWINGS

FIG. 19 is an exploded perspective view of the carpet held in the cavity prior to molding;

FIG. 20 is a perspective view of the pressurized molding step; and

FIG. 21 is an exploded perspective view of the mold opening and releasing the finished carpet mat.

DETAILED DESCRIPTION

Figure 1:
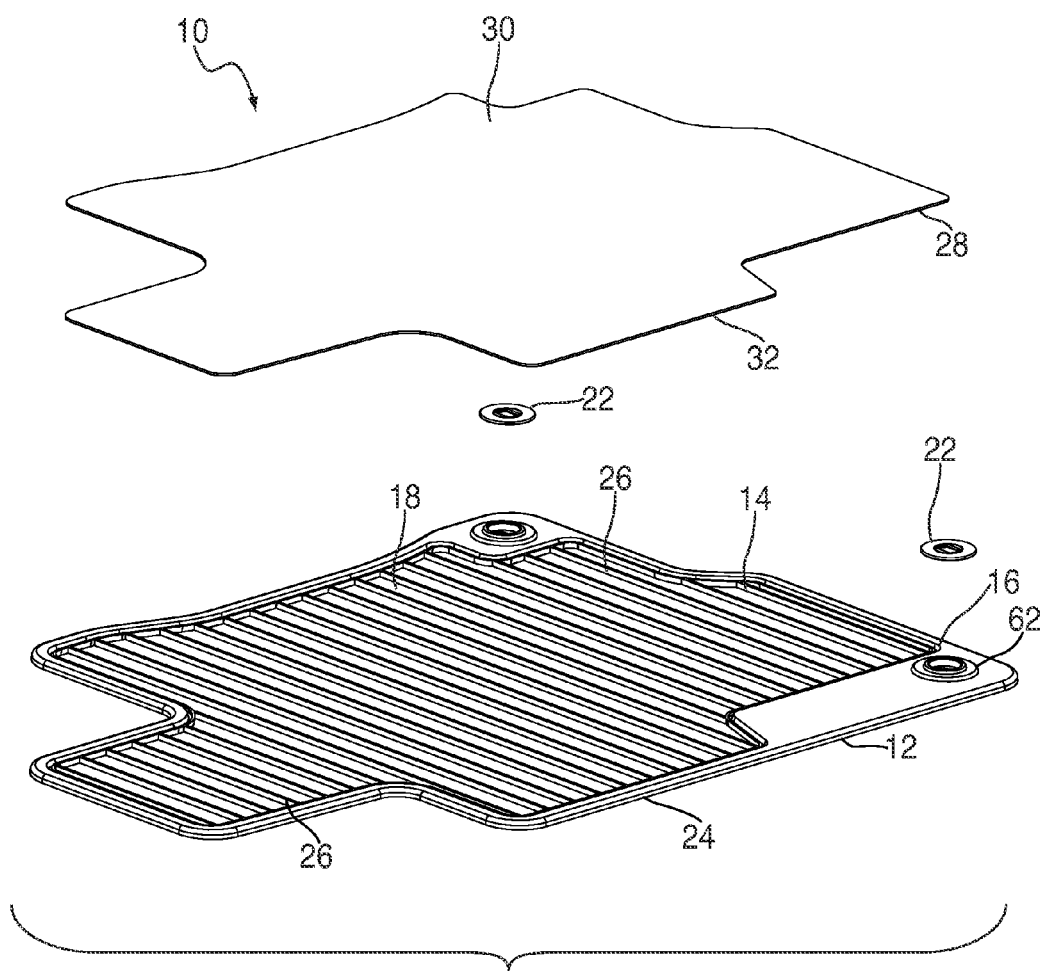
FIG. 1 is an exploded perspective view of the present carpet mat.
Figure 2:
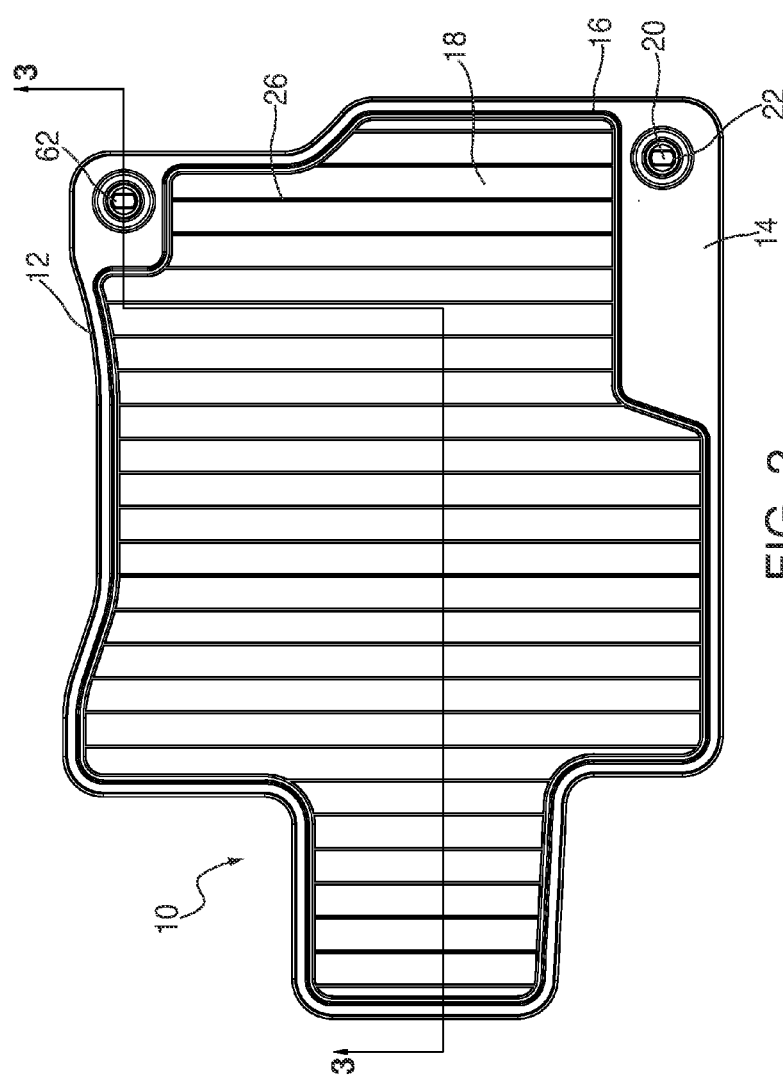
FIG. 2 is an overhead plan view of the mat of FIG. 1.
Figure 3:
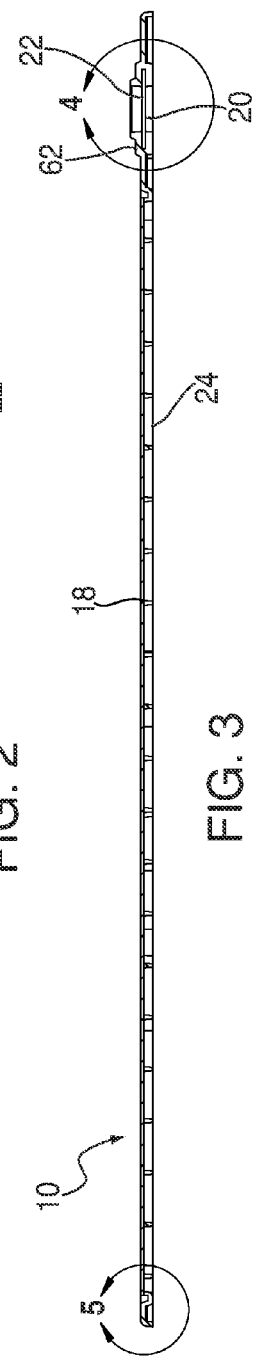
FIG. 3 is a cross-section taken along the line 3-3 of FIG. 2 and in the direction generally indicated.

Referring to FIGS. 1-6, the present injection molded carpet mat is depicted and generally designated 10. A flexible base 12 is made of bendable, injection moldable materials, including but not limited to polypropylene, ABS copolymers, thermoplastic rubbers or the like, as are well known in the art. The base 12 has an upper surface 14 having a peripheral edge 16 defining a carpet recess 18. Also found on the peripheral edge 16 is at least one grommet aperture 20 provided with a grommet 22 used for securing the mat 10 to a lug on a vehicle floor as is known in the art (not shown). Opposite the upper surface 14 is a lower mat surface 24. As seen in FIGS. 1 and 2, the carpet recess 18 is preferably provided with a plurality of spaced, parallel ribs 26 for strength and more efficient use of material.

Figure 4:
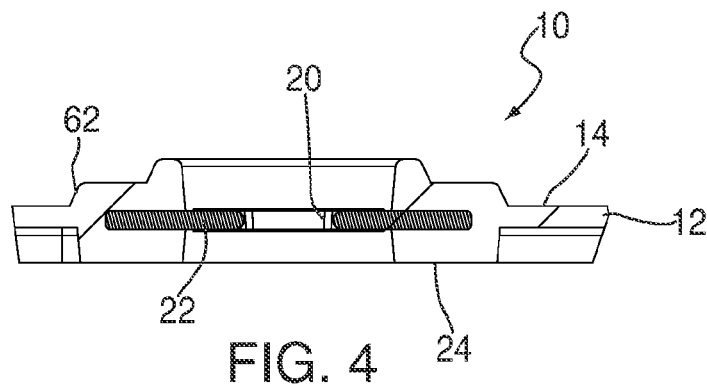
FIG. 4 is an enlarged fragmentary section marked '4' of the mat shown in FIG. 3.
Figure 5:
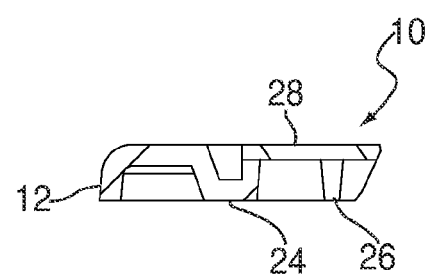
FIG. 5 is an enlarged fragmentary section marked '5' of the mat shown in FIG. 3.
Figure 6:
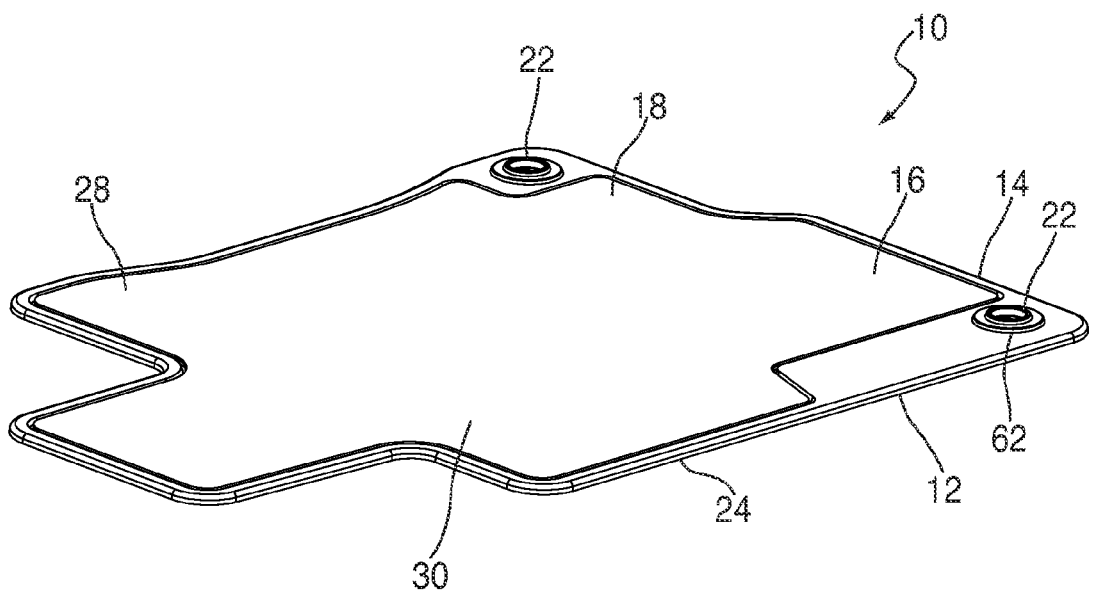
FIG. 6 is a top perspective view of the present carpet mat.

A sheet of carpet 28 is shaped to be inserted into the carpet recess 18, and has an upper nap side 30 and an opposite backing or attachment side 32. An important feature of the present mat 10 is that it is produced such that the base 12 is integrally formed around the carpet sheet 28 once the carpet has been placed in the mold, as will be described in greater detail below. In addition, the base 12 is preferably formed around the grommets 22. Once formed, the nap side 30 is flush with the upper surface 14 (FIGS. 5, 6). Further, the carpet sheet 28 is surrounded by the peripheral edge 16. As seen in FIG. 4, the grommet 22 is substantially encapsulated by the base 12.

Figure 7:
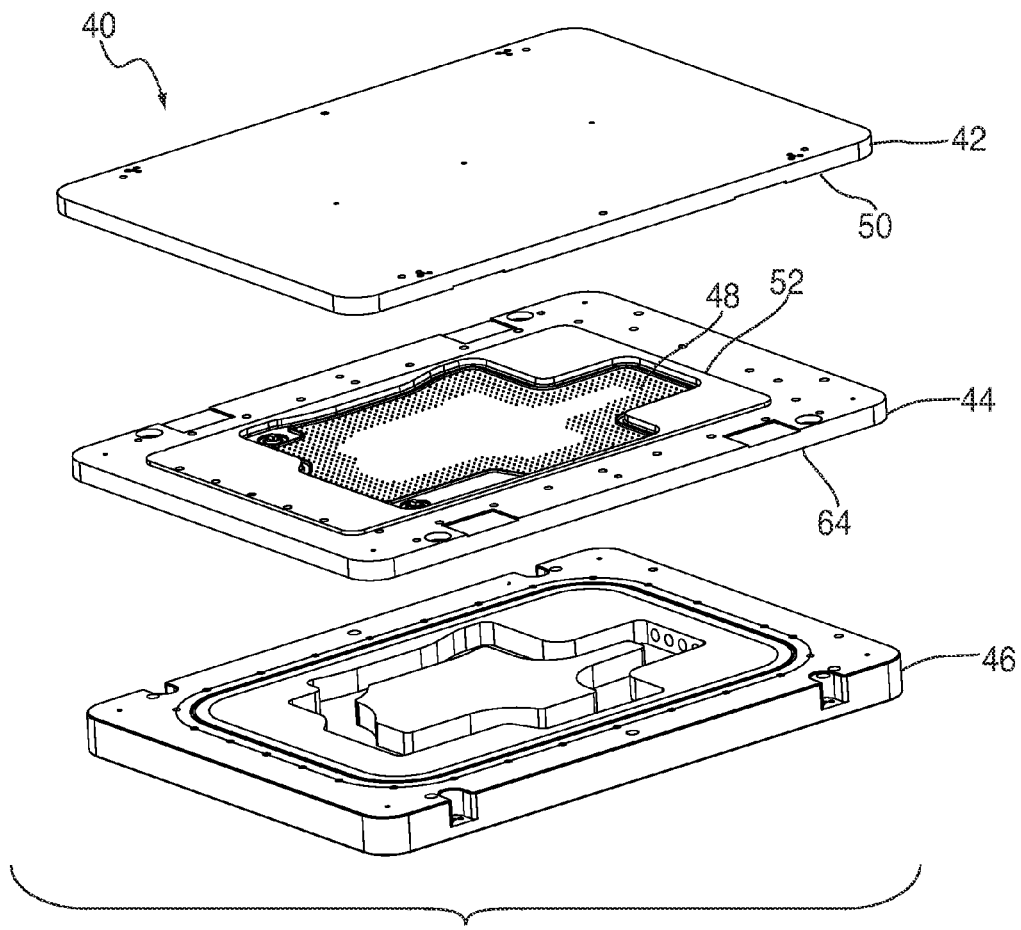
FIG. 7 is an exploded perspective view of the mold used for making the present carpet mat.

Referring now to FIGS. 7-16, and in particular FIG. 7, an injection mold suitable for use in manufacturing the present mat 10 is generally designated 40, and features three main components, a core 42, a cavity 44 and a backup plate 46. As is known in the art, the core 42 receives molten plastic through a sprue opening (not shown) which fills a mold recess 48 formed by opposing faces 50, 52 of the core and cavity 44 respectively. In the present application, the terms "core" and "cavity" are considered interchangeable and are generally intended to differentiate the main mold components defining the mold recess 48. The backup plate 46 provides support and vacuum to the cavity 44, as described below, and sandwiches the cavity between the plate and the core 42. Once placed in a conventional molding press (not shown), the assembled mold 40 is subjected to high-pressure clamping forces and the injection of molten flowing plastic material.

Figure 8:
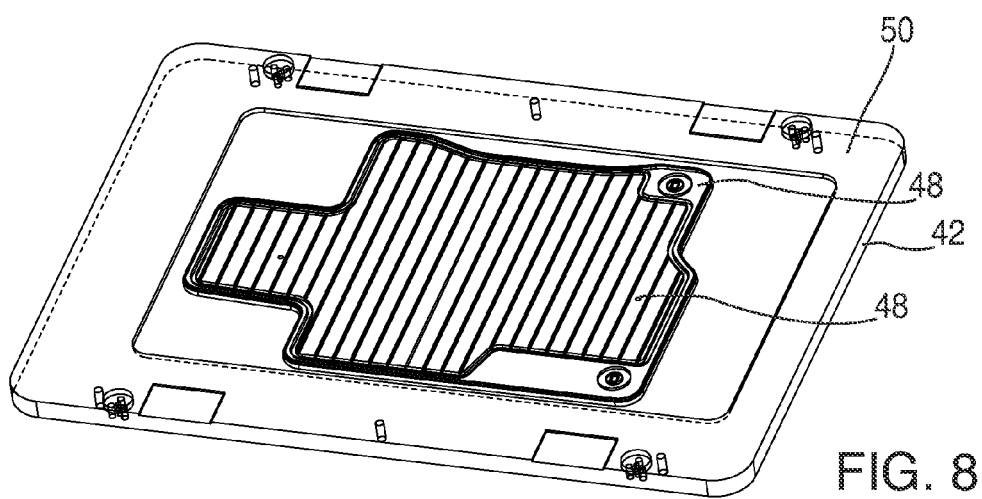
FIG. 8 is a top perspective view of the core portion of the mold.
Figure 9:
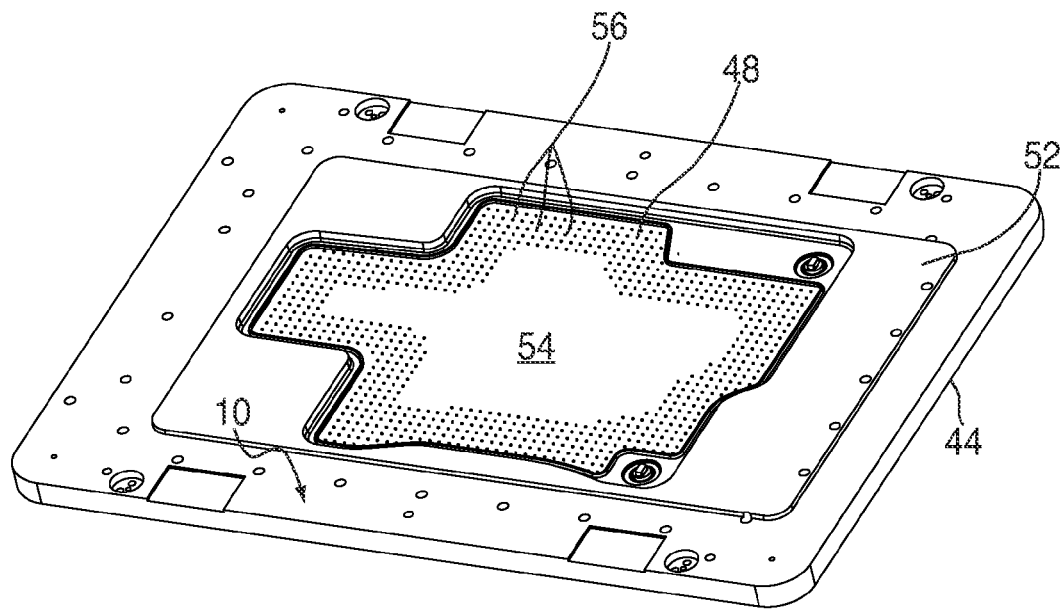
FIG. 9 is a top perspective view of the cavity portion of the mold.
Figure 10:
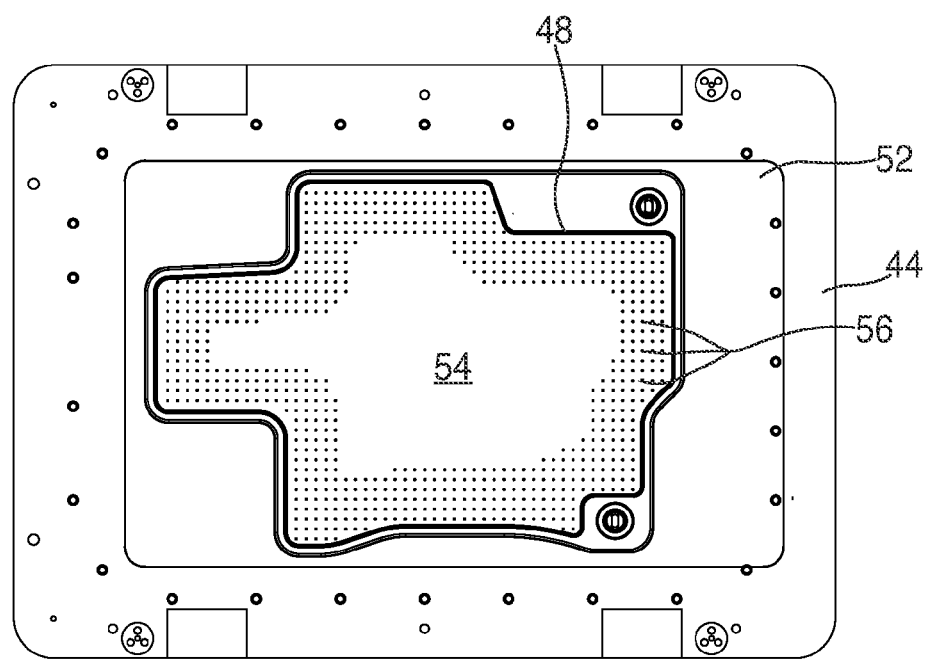
FIG. 10 is a top plan view of the cavity of FIG. 9.
Figure 11:
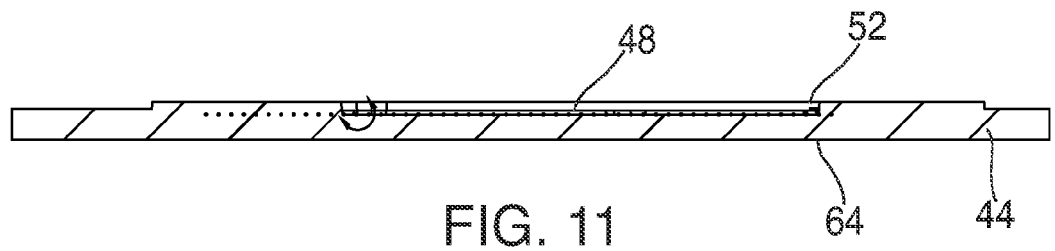
FIG. 11 is a cross-section taken along the line 11-11 of FIG. 10 and in the direction generally indicated.

Referring now to FIG. 8, the core face 50 is shown, with its share of the mold recess 48 having the inverse form of the mat base 12. Opposite the core 42, as seen in FIGS. 9-13 is the cavity 44. Designed to receive and retain the carpet sheet 28 during the molding process, the cavity 44 includes a carpet support plate 54 having at least one and preferably a plurality of vacuum openings 56. Bordering the carpet support plate 54 is a retaining barrier 58 disposed about a periphery of a carpet portion 60 of the mold recess 48. The cavity 44 also is configured for forming the upper mat surface 14, including bosses 62 surrounding the grommets 22.

Figure 12:
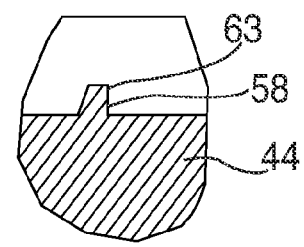
FIG. 12 is a fragmentary enlarged cross-section of the mold of FIG. 11.
Figure 13:
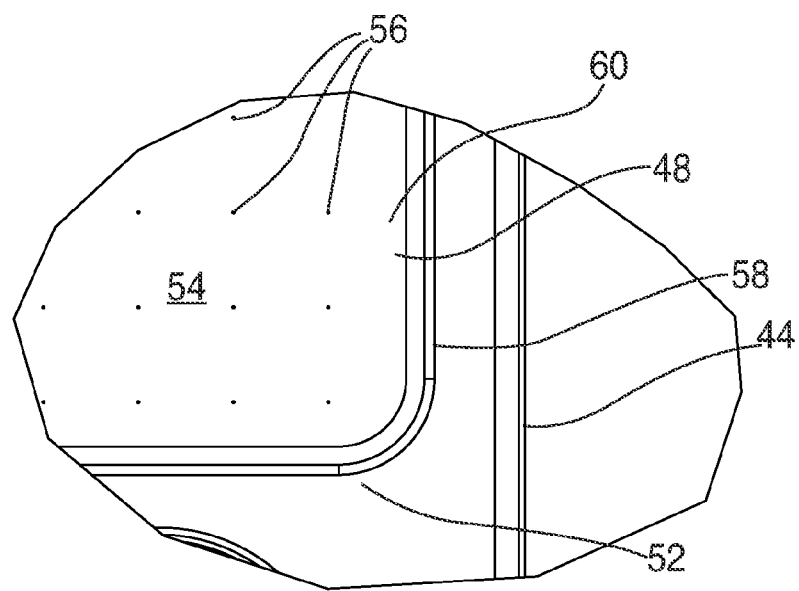
FIG. 13 is an enlarged fragmentary perspective view of the cavity of FIG. 9.
Figure 16:
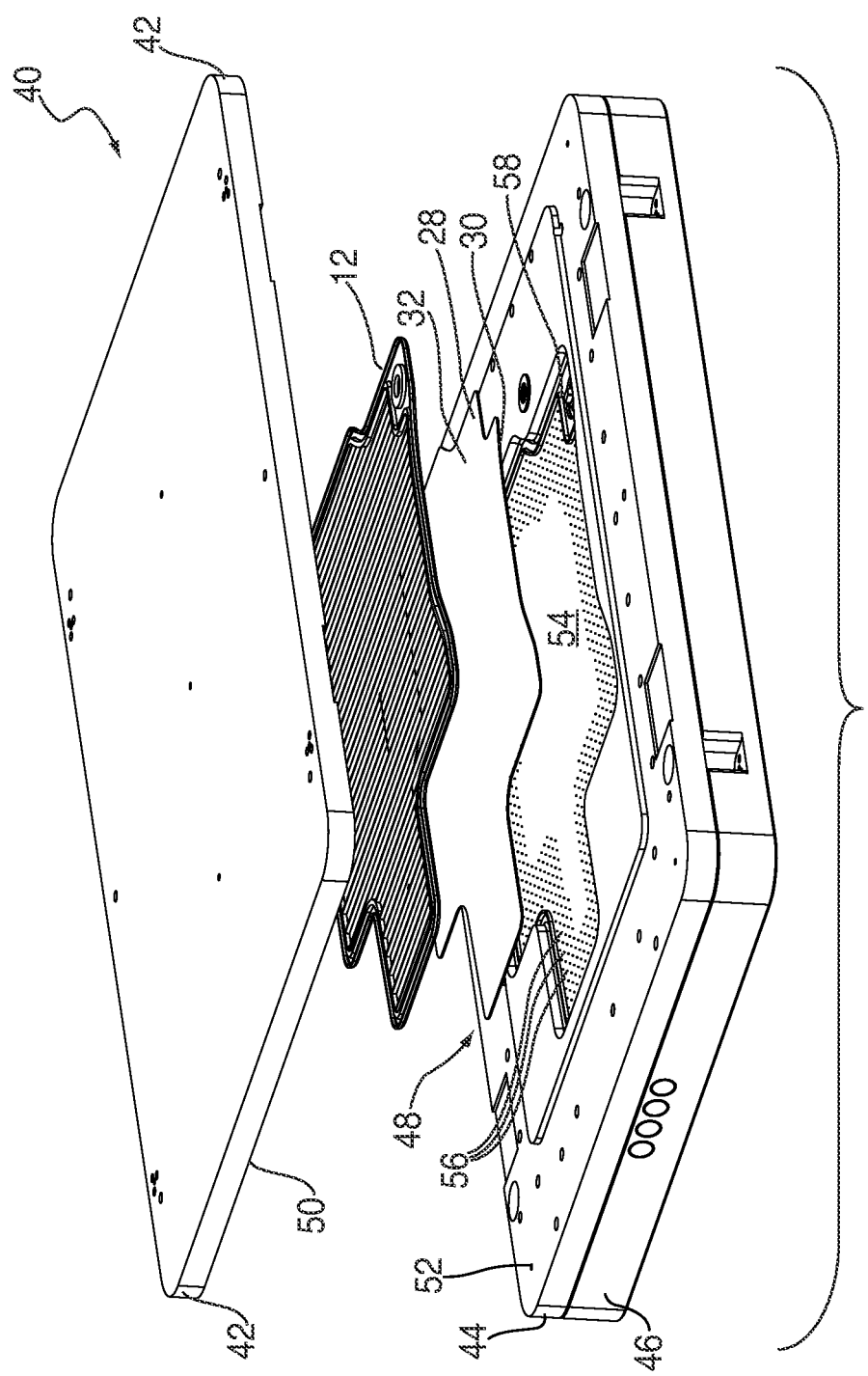
FIG. 16 is an exploded perspective view of the present carpet mat in the present mold.

Referring to FIGS. 12, 13 and 16, the retaining barrier 58 is dimensioned to hold the carpet sheet 28 in compression against the carpet support plate 54, with the nap side 30 contacting the support plate. In addition to compressing the carpet sheet 28 in place, upon assembly of the mold 40, the retaining barrier 58 is dimensioned to tightly engage the core 42 to prevent migration of the molten plastic into the carpeting during the molding process. As seen in FIG. 12, upon assembly of the mold 40, an edge 63 of the barrier 58 is in contact with the core 42 for protecting the carpet sheet 28 from unwanted contact with the molten plastic forming the mat base 12.

Figure 14:
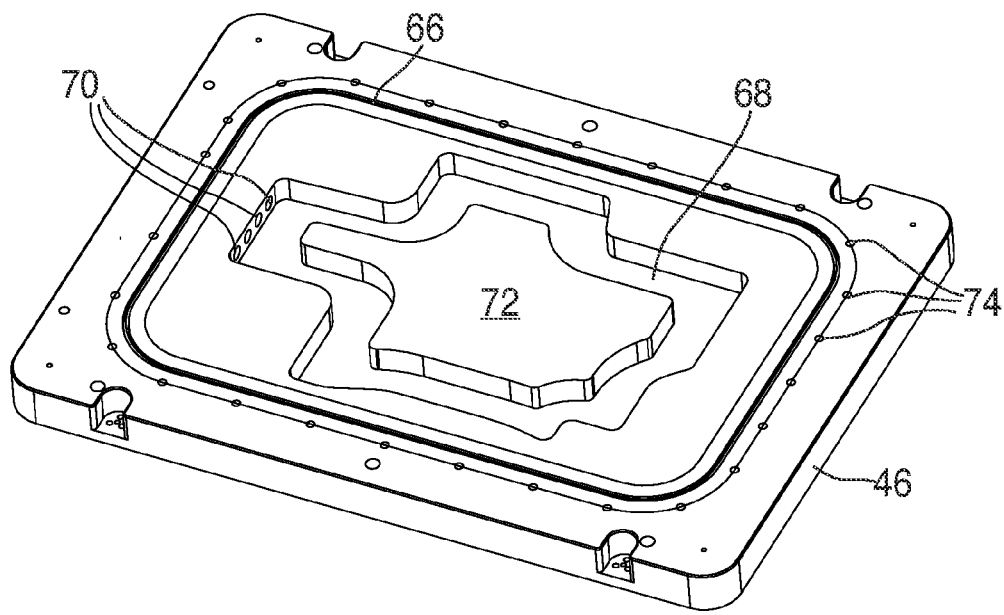
FIG. 14 is a top perspective view of the support plate of the present mold.
Figure 15:
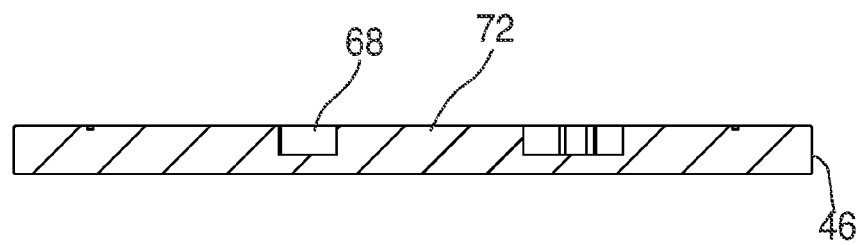
FIG. 15 is a cross-section taken along the line 15-15 of FIG. 14 and in the direction generally indicated.

Referring now to FIGS. 7, 14 and 15, the mold backup plate 46 is configured for tightly engaging a rear surface 64 of the cavity 44. Accordingly, a groove 66 is provided for receiving an O-ring (not shown) or sealing compound such as RTV silicone or the like for providing an airtight seal with the cavity 44. Within an area defined by the groove 66, a vacuum chamber 68 is in fluid communication with a plurality of vacuum ports 70. The vacuum chamber 68 is disposed on the backup plate 46 to be in registry with the perforated carpet support plate 54 on the cavity 44 upon assembly of the mold 40.

To support the cavity 44, and specifically the carpet support plate 54 for accommodating the pressurized injection of molten plastic into the mold 40, a mold support landing 72 is generally centrally located within and surrounded by the vacuum chamber 68. It will be appreciated that the support landing 72 may vary in configuration and disposition within the vacuum chamber 68 as long as it performs its support function. As seen in FIG. 15, the landing 72 is preferably an integral part of the backup plate 46. A plurality of bolt bores 74 surrounds the groove 66 and receives bolts (not shown) for attaching the backup plate 46 to the cavity 44.

Figure 17:
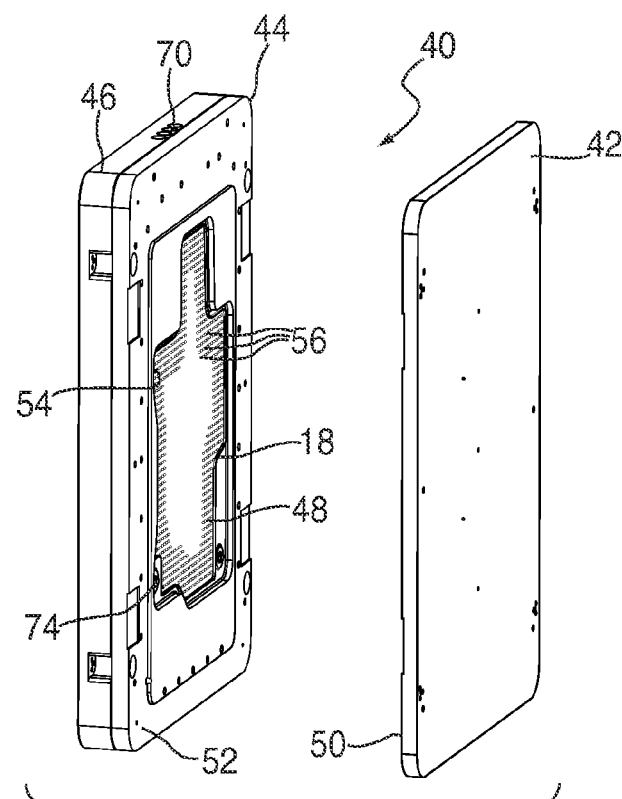
FIG. 17 is an exploded perspective view of the present mold in a first step of the mold cycle.

Referring now to FIGS. 17-21, a method for using the injection mold 40 to make the present carpet mat 10 is schematically illustrated. In FIG. 17, the mold 40 is shown with the backup plate 46 fastened to the cavity 44, and the core 42 spaced laterally away from the cavity. It is significant to note that the cavity 44 and the core 42 meet each other along a vertical plane. While shown schematically, it will be appreciated that each of the cavity 44 and the core 42 are attached to respective portions of a laterally or horizontally acting conventional injection molding press (not shown). This orientation is more efficient for producing mats in a mass production environment, and reduces mold cycle time since the mats are more easily removed from the mold 40.

Figure 18:
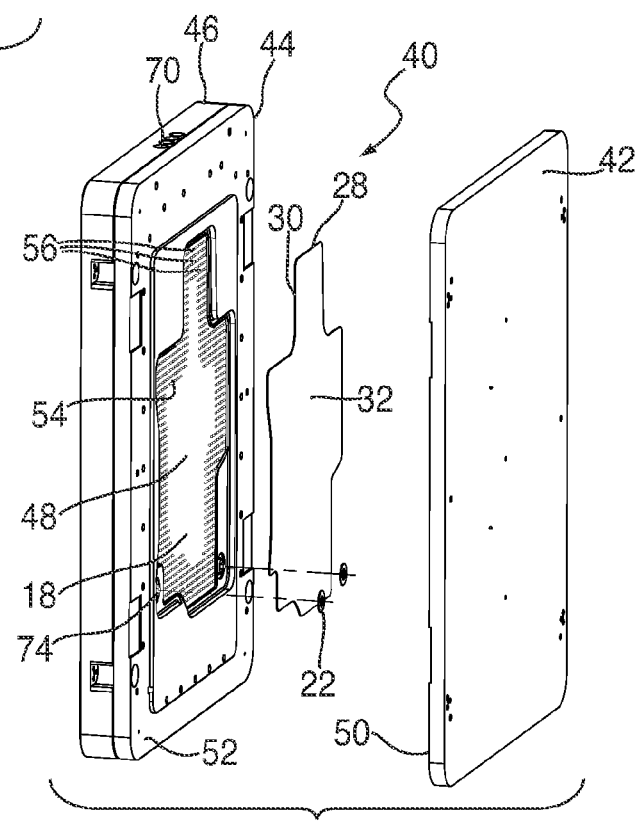
FIG. 18 is an exploded perspective view of a carpet insertion step in the present mold cycle.

Referring now to FIGS. 17 and 18, vacuum is applied to the backup plate 46, and the carpet sheet 28 is inserted within the carpet recess 18, located within the mold recess 48. Thus, the vacuum holds the carpet sheet 28 in place in the carpet recess 18. The carpet nap side 30 faces the carpet support plate 54 and the carpet backing side 32 faces the core 42. Sufficient vacuum is applied so that the carpet sheet 28 is compressed within the area defined by the retaining barrier 58. Also, at this time, the grommets 22 are located upon suitable grommet pegs 74. The application of the carpet sheet 28 and the grommets 22 may be accomplished manually or automatically.

As seen in FIGS. 19 and 20, once the carpet sheet 28 and the grommets 22 are in place, the molding press begins to close, as is known in the art. Vacuum is maintained in the backup plate 46 throughout this process to maintain the carpet sheet 28 in place under compression. Upon closing (FIG. 20), the mold recess 48 is sealed and a flowable supply of molten plastic is injected into the recess in conventional fashion.

Referring now to FIG. 21, after a specified period of time, during which the molten plastic at least partially solidifies, the mold 40 is opened through operation of the molding press. The completed mat 10 is then removed from the mold 40, either manually or automatically.

Thus, it will be seen that the present carpet mat 10 embodies a superior production technique, which prevents molten plastic from flowing into the carpet sheet 28. Further, the use of vacuum to hold the carpet sheet 28 in place under compression during the molding process reduces mold cycle time and provides a more consistent product.

While a particular embodiment of the floor mat with integrally molded carpeting has been described herein, it will be appreciated by those skilled in the art that changes and modifications may be made thereto without departing from the invention in its broader aspects and as set forth in the following claims.

The invention claimed is:

1. A method for producing a carpet mat by injection molding, comprising:

providing an injection mold including a cavity and a complementary core, each defining a portion of a mold recess for accommodating the finished carpet mat;

providing said cavity with a surface having at least one vacuum opening bordered by a peripheral retaining barrier;

applying vacuum to said cavity;

inserting a sheet of carpet into said mold recess of said cavity and against said surface so that said carpet is held in said recess by said vacuum;

closing the cavity and core, thus sealing said mold recess;

injecting a flowable supply of plastic into said mold recess;

opening said mold after a specified period, allowing said plastic to at least partially solidify; and providing sufficient vacuum so that said carpet sheet is compressed within a space defined by said barrier.

2. The method of claim 1 wherein said mold is oriented so that said cavity and core meet along a vertical plane.

3. The method of claim 1 further including dimensioning said peripheral barrier so that said carpet sheet is compressed upon insertion into said recess and application of said vacuum.

4. The method of claim 1 further including placing a nap side of said carpet sheet in contact with said core and a reverse backing side of said carpet sheet faces said cavity.

5. The method of claim 1 further including inserting grommets onto pegs projecting from said cavity prior to closing said mold so that said grommets are integrally molded into said mat.

6. The method of claim 1 further including providing said cavity with a mold support landing behind said surface for supporting said carpet sheet when held in place by said vacuum.

* * * * *